Patented Jan. 8, 1924.

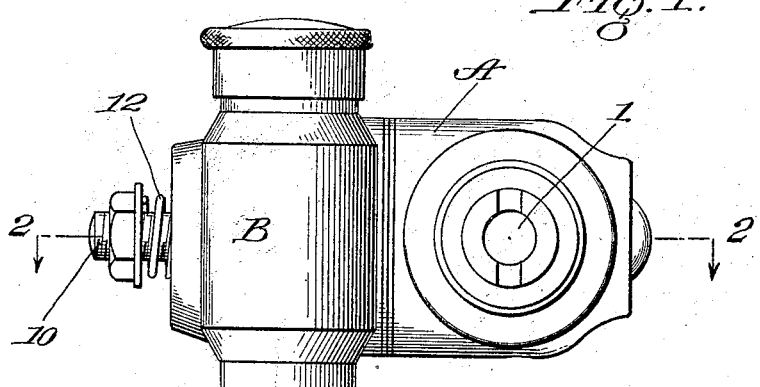
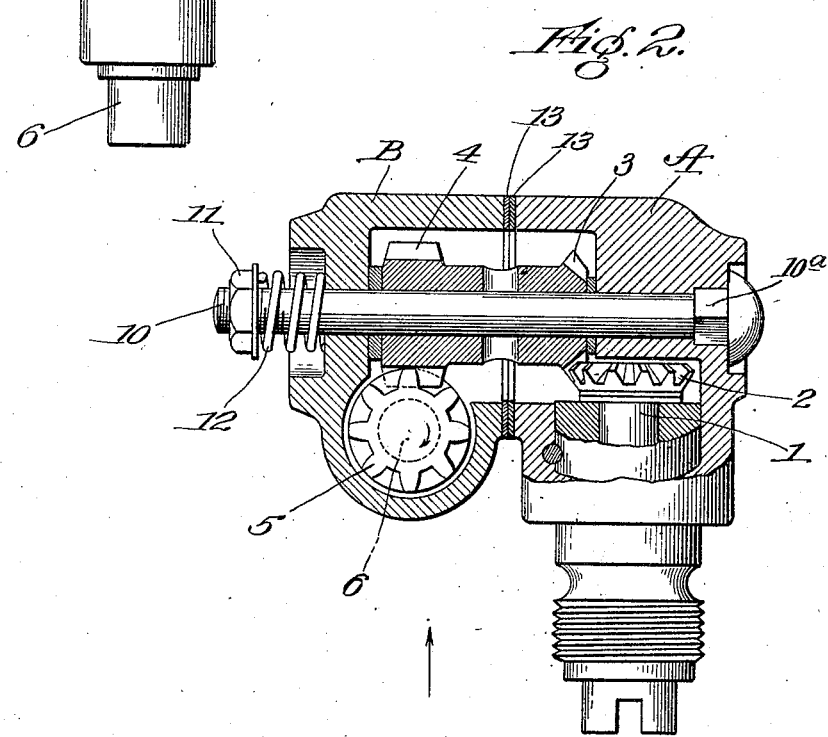

1,480,005

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

SWIVEL-GEAR HOUSING AND JOINT.

Application filed March 30, 1922. Serial No. 548,239.

*To all whom it may concern:*

Be it known that I, JOHN K. OLSEN, a citizen of the United States, having residence in the city of Chicago, in the county of Cook and State of Illinois, have invented certain new and useful Improvements in Swivel-Gear Housings and Joints, of which the following is a specification, reference being had to the accompanying drawings, forming a part thereof.

The purpose of this invention is to provide an improved construction in a swivel gear housing joint for the purpose specifically of keeping the joint grease-tight without unduly binding the parts against each other so as to increase the friction of swiveling action. It consists of the features of construction shown and described and as indicated in the claims.

In the drawings:—

Figure 1 is a plan view of a gear housing joint embodying this invention.

Figure 2 is a section at the line 2—2 on Figure 1.

The joint shown in the drawings comprises two housing members, A and B, each having its cavity open at one side, the two members being seated upon each other at their said open sides for uniting their cavities in a continuous chamber in which the gears are housed and grease is contained. In the form of joint shown, one of the pairs of intermeshing gears are bevel gears, and the other pair are spiral or twist gears. The intermediate bevel and twist gears are conveniently and desirably formed integrally and journaled upon the journal pivot bolt which connects the two housing members, penetrating both of them at and directly transverse of their meeting and seating plane. As shown, and as usually more convenient, the driven shaft is that of the driven spiral gear, the drive shaft having the driving gear of the bevel gear pair. Referring to the drawings, 1, is the driving shaft carrying the driving bevel gear, 2, for meshing with the driven bevel gear, 3, 4 is the driving spiral gear meshing with the driven spiral gear, 5, on the driven shaft, 6, which protrudes from the housing member, B, and is adapted for coupling with the rotating member and encased flexible shaft, the housing member, B, being terminated suitably for attaching to it the casing of such flexible shaft. 10 is a pivot-and-journal bolt which extends through the two housing members, A and B, as stated transverse with respect to the meeting plane, and axially of the intermediate unitary gear member, 3, 4. The pivot-and-journal bolt is adapted, adjacent to its headed end, for engaging non-rotatably with the housing member, A, as, by having a squared shoulder portion, 10ª. The opposite end which protrudes from the housing member, B, is provided with a nut, 11, serving as a stop for a spring, 12, coiled about the bolt between said nut and the housing member, B, and thereby reacting for limitedly clamping two housing members together at their faces seated upon each other for their swiveling action. The housing members, being desirably made by die-casting of, relatively soft metal, are preferably provided with steel wearing washers, 13, 13, at their meeting and seating faces, and these washers are faced so that a secure grease-tight joint is effected between them when they are held snugly together by the action of the spring, 12.

I claim:—

1. In a swivel gear joint and housing, in combination with two gear housing members and a pair of intermeshing gears in each of them, all constituting a four-gear train of which the two intermediate gears are co-axial and rigid with each other, the two housing members being adapted to seat upon each other at a plane transverse to the axis of said co-axial gears; a bolt extending through the housing members and said co-axial gears for binding the housing members together and journalling said co-axial gears; said bolt being stopped as to rotation at its seat in one of the housing members, shouldered for stopping longitudinally on one of them and being of uniform diameter through the entire length of and beyond the other, and a spring on said bolt outside the housing stopped between the adjacent housing member and the head or nut of the bolt.

2. In a gear housing joint which comprises two gear housing members, each having a gear and grease cavity open at one side, the said members being seated on each other at their said open sides for uniting their cavities in a continuous chamber; a journal bolt extending through said housing members at and transversely of the plane of their meeting faces; means for holding said journal bolt non-rotatably in one housing member and for stopping it longitudinally therein; a stop at the other end of the bolt and a spring on the bolt reacting between said stop and the other housing member for holding the two housing members seated grease-tight on each other at their said meeting plane.

In testimony whereof, I have hereunto set my hand at Chicago, Illinois, this 27 day of March, 1922.

JOHN K. OLSEN.